(12) United States Patent
Subramanian et al.

(10) Patent No.: US 9,424,544 B2
(45) Date of Patent: Aug. 23, 2016

(54) ARCHIVAL MANAGEMENT OF BUSINESS PROCESSES IN A CLOUD ENVIRONMENT

(71) Applicant: International Business Machines Corporation, Armonk, NY (US)

(72) Inventors: Vijayaganesh Subramanian, Bangalore (IN); Ashish Mungi, Bangalore (IN); Gandhi Sivakumar, Bentleigh (AU); Ram Viswanathan, Plano, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 230 days.

(21) Appl. No.: 13/910,442

(22) Filed: Jun. 5, 2013

(65) Prior Publication Data

US 2014/0365442 A1 Dec. 11, 2014

(51) Int. Cl.
*G06F 7/00* (2006.01)
*G06Q 10/06* (2012.01)
*G06F 9/445* (2006.01)

(52) U.S. Cl.
CPC . *G06Q 10/06* (2013.01); *G06F 8/65* (2013.01)

(58) Field of Classification Search
CPC .............. G06Q 10/103; G06Q 10/067; G06Q 10/1091; G06Q 40/125; G06Q 10/06; G06F 11/1469
USPC .......................................... 707/668, 665, 695
See application file for complete search history.

(56) References Cited

U.S. PATENT DOCUMENTS

| | | | | | |
|---|---|---|---|---|---|
| 4,809,170 | A | * | 2/1989 | Leblang et al. | 717/122 |
| 5,495,610 | A | * | 2/1996 | Shing et al. | 709/221 |
| 6,721,713 | B1 | * | 4/2004 | Guheen et al. | 705/1.1 |
| 7,315,826 | B1 | * | 1/2008 | Guheen et al. | 705/7.29 |
| 7,340,461 | B2 | * | 3/2008 | Vishlitzky et al. | 711/162 |
| 7,349,915 | B1 | | 3/2008 | Moore et al. | |
| 7,503,034 | B2 | * | 3/2009 | Berg et al. | 717/120 |
| 7,831,787 | B1 | * | 11/2010 | Yueh | 711/161 |
| 8,015,541 | B1 | * | 9/2011 | Srinivasan et al. | 717/104 |
| 8,572,613 | B1 | * | 10/2013 | Brandwine | 718/100 |
| 8,589,207 | B1 | * | 11/2013 | Macosky et al. | 705/7.27 |

(Continued)

OTHER PUBLICATIONS

"Archive Business Process Service"; Printed Jan. 28, 2013; <http://pic.dhe.ibm.com/infocenter/sb2bi/v5r2/topic/com.ibm.help.svcs_adpts_a_1.doc/Archive_BP_svc.html>.

(Continued)

*Primary Examiner* — Mohammed R Uddin
(74) *Attorney, Agent, or Firm* — Ronald Kaschak; Arnold B. Bangali

(57) ABSTRACT

A method for archival management of business processes in a cloud environment is provided. In one aspect, the method comprises archiving managed pool including one or more versions of a business process instance or business process execution in a cloud computing environment. The method further comprises a provisioning manager of the cloud computing environment that requests or tasks provisioning, deprovisioning, decommissioning or deleting the one or more versions of a business process instance or business process execution. For each of the requests or tasks, a restore manager of the cloud environment determines, if the managed pools of virtual instances contain a business process management environment or a business process archive manager environment. The restore manager further recreates a previous version of the one or more versions of the business process instance or business process execution based on the determination.

14 Claims, 6 Drawing Sheets

(56) References Cited

U.S. PATENT DOCUMENTS

| | | | |
|---|---|---|---|
| 8,738,575 | B2* | 5/2014 | Anglin et al. .................. 707/640 |
| 2001/0049712 | A1* | 12/2001 | Leymann et al. ............. 709/100 |
| 2002/0144256 | A1* | 10/2002 | Budhiraja et al. ............. 717/174 |
| 2003/0204835 | A1* | 10/2003 | Budhiraja .................. G06F 8/71 717/120 |
| 2007/0067358 | A1* | 3/2007 | Barrs et al. ..................... 707/203 |
| 2007/0162318 | A1* | 7/2007 | Bean et al. ......................... 705/8 |
| 2007/0276883 | A1 | 11/2007 | Kumar et al. |
| 2009/0089078 | A1* | 4/2009 | Bursey .............................. 705/1 |
| 2010/0082553 | A1* | 4/2010 | Beatty et al. .................. 707/679 |
| 2010/0293147 | A1* | 11/2010 | Snow ................ G06F 17/30067 707/640 |
| 2011/0265087 | A1* | 10/2011 | Chen et al. .................... 718/102 |
| 2011/0289046 | A1 | 11/2011 | Leach et al. |
| 2012/0030180 | A1* | 2/2012 | Klevenz ............ G06F 17/30073 707/661 |
| 2012/0054301 | A1* | 3/2012 | Kieselbach ............ G06Q 10/06 709/217 |
| 2012/0124046 | A1* | 5/2012 | Provenzano .................. 707/737 |
| 2012/0179740 | A1 | 7/2012 | Shaqed et al. |
| 2012/0197952 | A1* | 8/2012 | Srinivasaraghavan ........ 707/825 |
| 2013/0036091 | A1* | 2/2013 | Provenzano et al. .......... 707/624 |
| 2013/0036115 | A1* | 2/2013 | Schwarz et al. ............... 707/736 |
| 2013/0158964 | A1* | 6/2013 | Hall .................... G06Q 10/0633 703/3 |
| 2014/0013318 | A1* | 1/2014 | Rychikhin .................... 717/172 |
| 2014/0068042 | A1* | 3/2014 | Mungi et al. .................. 709/223 |

OTHER PUBLICATIONS

Brevard County (FL) Cleark Selects kloudtrack for Saas/Cloud-Base . . . ; "Brevard County (FL) Cleark Selects kloudtrack for SaaS/Cloud-Based Backup, Archival, Records Management and Transparent Workflow"; Printed Jan. 28, 2013; <http://www.kloudtrack.com/brevard-county-fl-cleark-selects-kaulkin-information-systems-for-saascloud-based-backup-archival-records-man . . . >.

"BPEL process archiving overview"; Printed Jan. 28, 2013; <http://publib.boulder.ibm.com/inforcenter/dmndhelp/v7r5mx/topic/com.ibm.wbpm.imuc.doc/topics/c5_archive.html>.

"Business Objects"; Project Shaktipat—Bringing business and technology together; Printed Jan. 28, 2013; <http://www.shaktipat.ch/saraswait/business-objects/>.

Jack Clark; "Amazon launches Glacier cloud storage, hopes enterprise will go cold on tape use"; Aug. 21, 2012; Printed Jan. 28, 2013; <http://www.zdnet.com/amazon-launches-glacier-cloud-storge-hopes-enterprise-will-go-cold-on-tape-use-7000002926/?s_cod=528>.

Jack Clark; "AWS Glacier's dazzling price benefits melt next to the cost of tape"; Aug. 23, 2012; Printed Jan. 28, 2013; <http://www.zdnet.com/aws-glaciers-dazzling-price-benefits-melt-next-to-the-cost-of-tape-7000003068/? s_cid=528>.

"kloudflow: Business Process and Work-Flow"; kloudtrack; Copyright 2012 kloudtrack; Printed Jan. 28, 2013; <http://www.kloudtrack.com/solutions/kloudtrack-saas-cloud-platform/kloudflow/>.

"kloudtrack"; kloudtrac Saas/Cloud Technology Platform; Copyright 2012 kloudtrack; Printed Jan. 28, 2013; <http://www.kloudtrack.com>.

"kloudtrack Platform—Sophisticated Cloud 2.0 Technologies"; kloudtrack; Copyright 2012 kloudtrack; Printed Jan. 28, 2013; http://www.kloudtrack.com/solutions/kloudtrack-saas-cloud-platform/>.

"IBM Business Process Manager Information Center"; Copyright 1993, 2011; Printed Jan. 28, 2013; <http://publib.boulder.ibm.com/infocenter/dmndhelp/v7r5mx/topic/com.ibm.wbpm.main_doc/ic-homepage-bpm.html>.

"Implementing an InfoSphere Optim Data Growth Solution"; IBM Information Management Software; <ibm.com/redbooks>.

\* cited by examiner

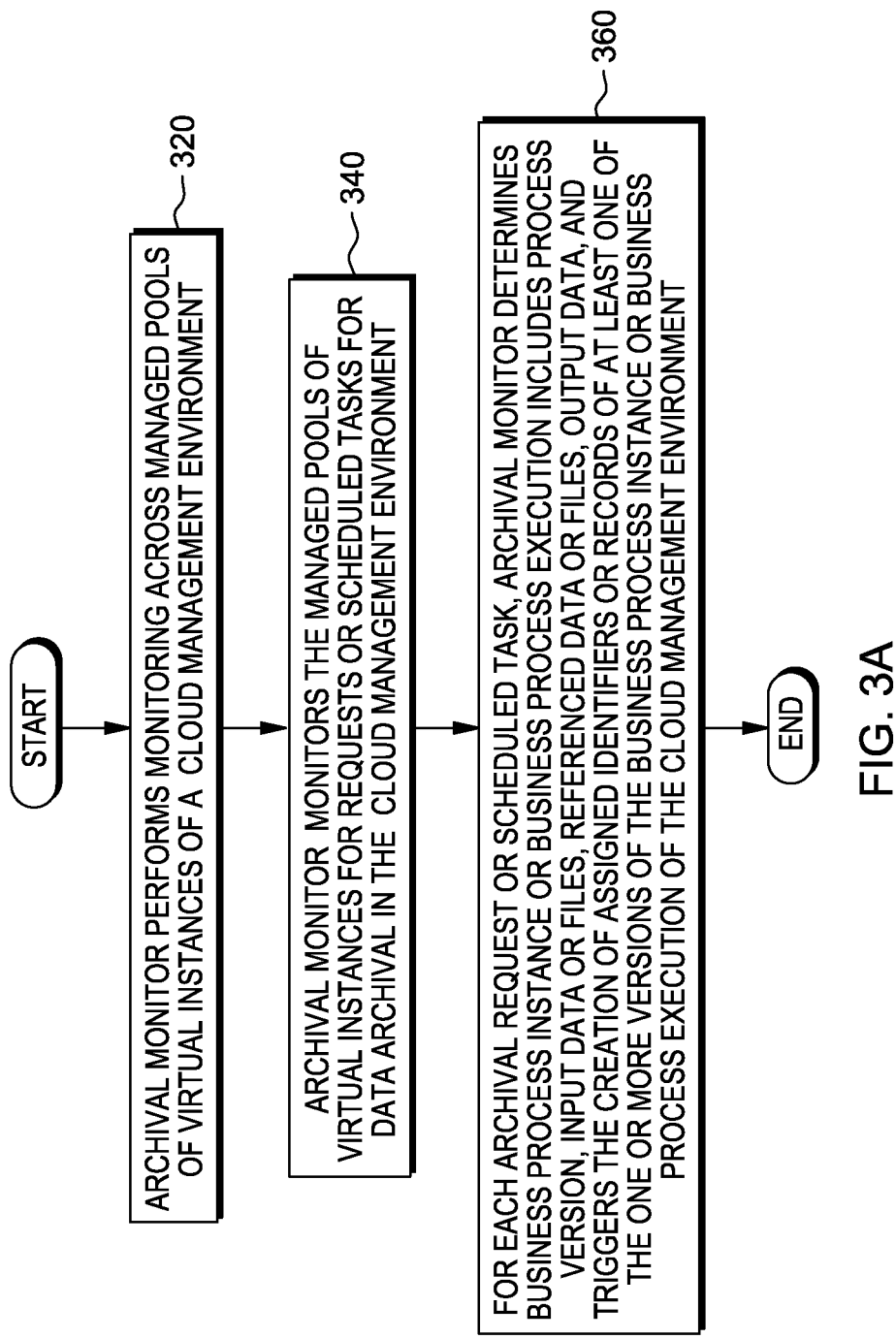

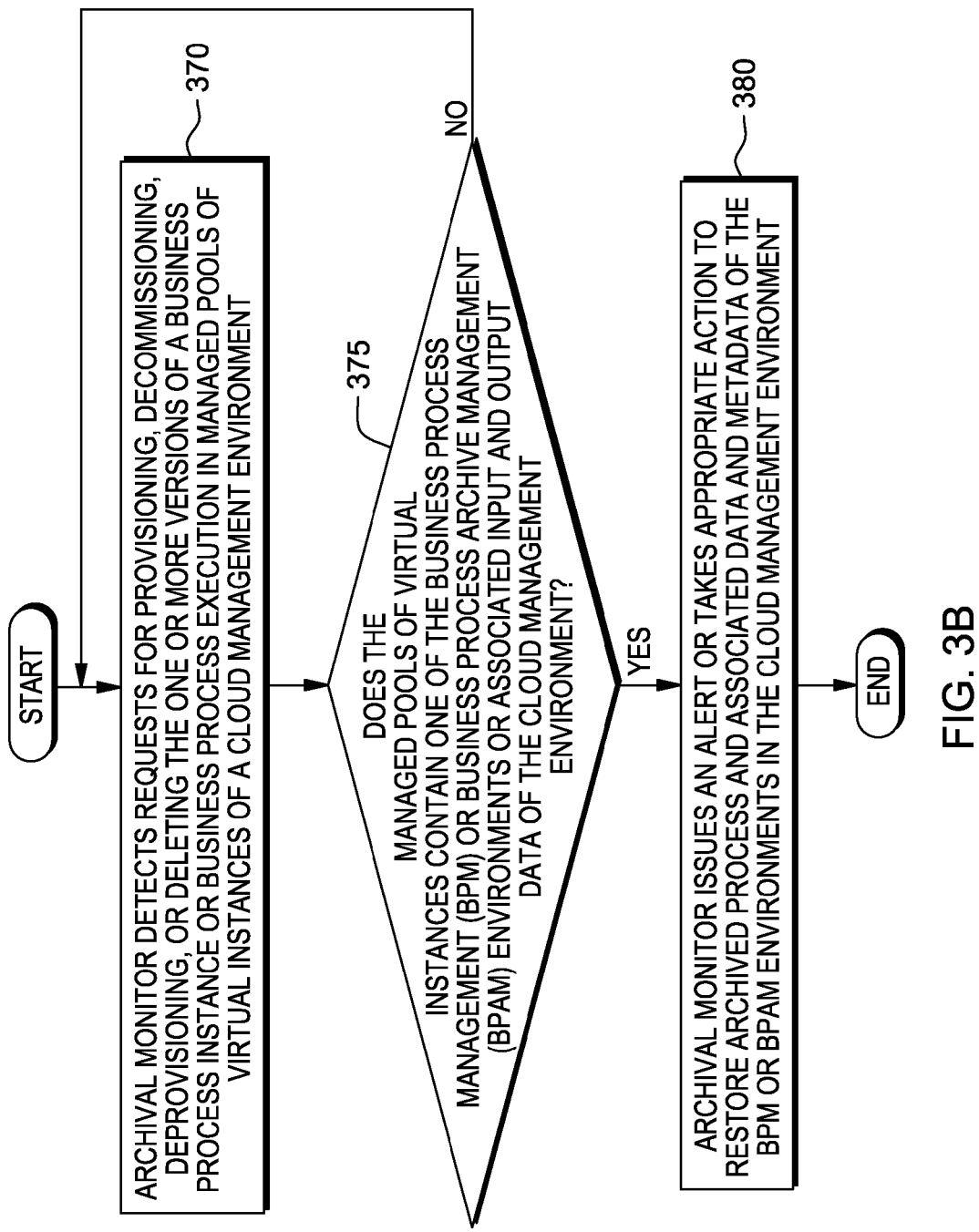

ARCHIVAL MANAGEMENT OF BUSINESS PROCESSES IN A CLOUD ENVIRONMENT

FIELD OF THE INVENTION

The present invention relates generally to network business process management, and more particularly to network archival of business management processes in a cloud computing environment.

BACKGROUND

Service oriented architecture (SOA), Business Process Management (BPM), and cloud-based architectures are known paradigms in recent times. Cloud computing concepts include, for example, automation, virtualization, metering, and monitoring. Cloud computing further includes service based computing layers, such as, Software-as-a-Service (SaaS), Platform-as-a-Service (PasS) and Infrastructure-as-a-Service (IaaS). Existing enterprises, including, for example, telecom companies or insurance companies, have business processes implemented through BPM. Moreover, both of these types of enterprises may have BPM applications with short-running or long running processes, which may be SOA or non-SOA.

Moreover, today's BPM software environment can be complex, with processes referencing different input data sources and master data repositories, and writing output data to different formats and data repositories. Business rules may be separated into repositories and referenced through rules engines. Processes may be versioned, and multiple versions of a process definition or process template may exist simultaneously, and may be invoked depending on business rules or needs. In another scenario, specific process versions may be in use due to an active instance of a long running business process. The process version may get upgraded to a new version and future process instances may use the new version of the process. In one instance, this may give rise to a situation where multiple versions of the same process may be active simultaneously through separate process instances. Existing BPM Software supports some level of process archiving. However, recreating a previous version of an entire process instance or process execution, including, process version, input data or file, any referenced master data or master files, output data, and all associated metadata of the BPM, poses a significant challenge, and an even bigger challenge in a cloud computing environment.

SUMMARY

In one embodiment of the present invention, a method for archiving business processes in a virtualized cloud computing environment is provided. The method comprises archiving, by one or more computer processors, managed pools of virtual instances, wherein each managed pool includes one or more versions of a business process instance or business process execution in the managed pools of virtual instances of a cloud environment. The method further comprises, monitoring, by the one or more computer processors, an automation manager to detect requests or tasks for provisioning, deprovisioning, decommissioning or deleting the one or more versions of a business process instance or business process execution. Further, for each of the requests or tasks, the method comprises determining, by the one or more computer processors, if the managed pools of virtual instances contain a business process management environment or a business process archive manager environment. The method further comprises recreating, by the one or more computer processors, a previous version of the one or more versions of the business process instance or business process execution based on the determination.

In another embodiment, a computer system is for archiving business processes in a virtualized cloud computing environment is provided. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to archive managed pools of virtual instances, wherein each managed pool includes one or more versions of a business process instance or business process execution in the managed pools of virtual instances of a cloud environment. The computer system further comprises program instructions to monitor an automation manager to detect requests or tasks for provisioning, deprovisioning, decommissioning or deleting the one or more versions of a business process instance or business process execution. The computer system further comprises program instructions to determine if the managed pools of virtual instances contain a business process management environment or a business process archive manager environment for each of the requests or tasks. The computer system further comprises program instructions to recreate a previous version of the one or more versions of the business process instance or business process execution based on the determination.

In yet another embodiment, a computer program product for archiving business processes in a virtualized cloud computing environment is provided. The computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer program product further comprises program instructions to archive managed pools of virtual instances, wherein each managed pool includes one or more versions of a business process instance or business process execution in the managed pools of virtual instances of a cloud environment. The computer program product further comprises program instructions to monitor an automation manager to detect requests or tasks for provisioning, deprovisioning, decommissioning or deleting the one or more versions of a business process instance or business process execution. The computer program product further comprises program instructions to determine if the managed pools of virtual instances contain a business process management environment or a business process archive manager environment for each of the requests or tasks. The computer program product further comprises program instructions to recreate a previous version of the one or more versions of the business process instance or business process execution based on the determination.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying Figures, wherein like reference numerals indicate like components, and:

FIG. 3A-3C are flowcharts depicting steps performed by virtual process archival manager (VPAM) to archive business processes, monitor requests or scheduled tasks for archival or restoration, and restoration of business processes in a managed pools of virtual instances of a business process management (BPM) in a cloud management environment, in accordance with embodiments of the present invention.

DETAILED DESCRIPTION

Figure 1:
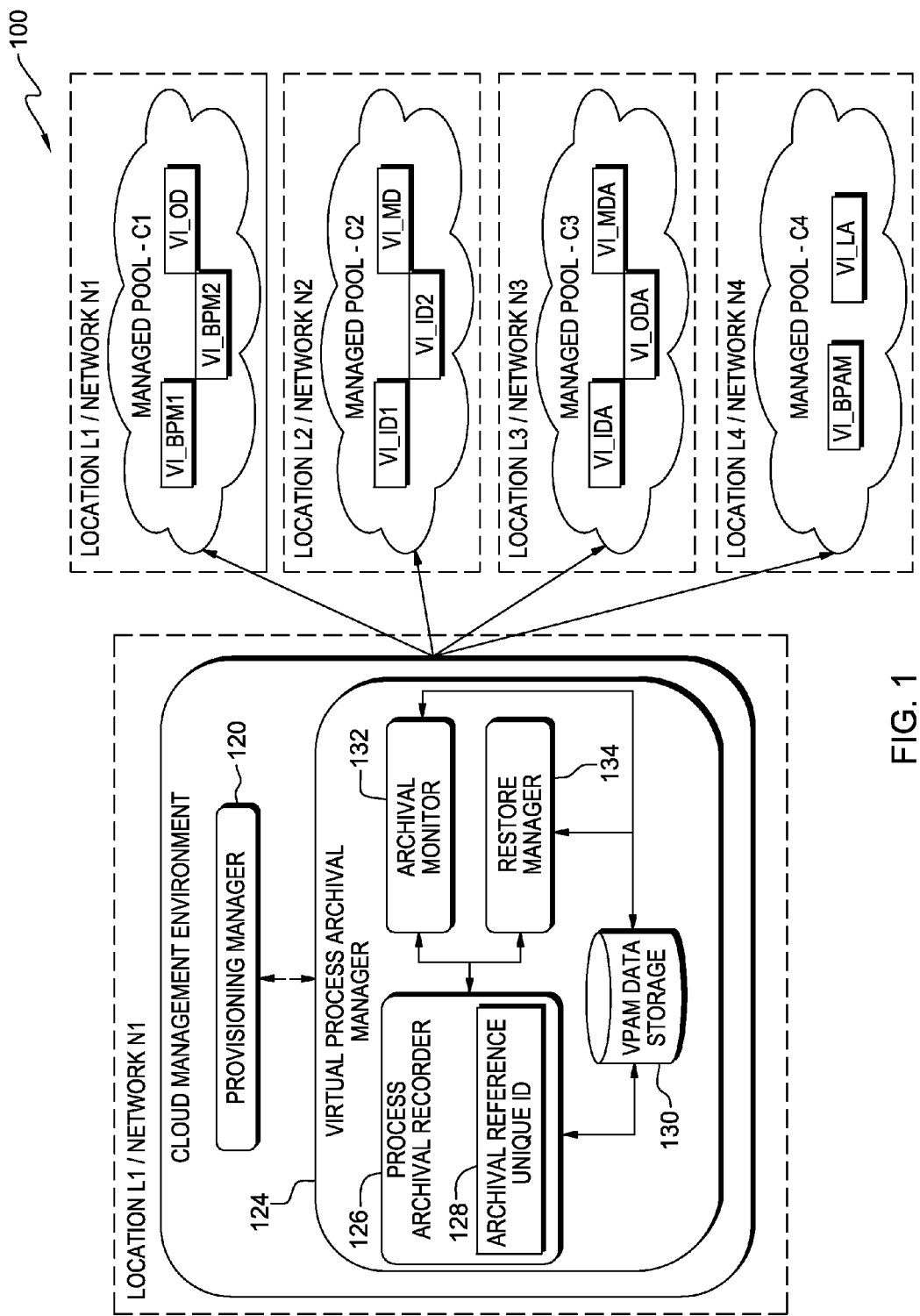
FIG. 1 is a block diagram of a cloud management environment, in accordance with an embodiment of the present invention.

The present invention will now be described in detail with reference to the accompanying Figures. Referring now to FIG. 1, cloud management environment 100 for archiving business process management (BPM), including, for example, recreating or restoring a previous version of an entire business process instance or process execution of the BPM in cloud management environment 100.

BPM is a systematic approach for providing efficient management of workflow of business goals or activities of a business or organization. According to the present invention, business processes of the business process instance are sets of business related activities that are invoked to achieve the business goals or activities of BPM. Also, a process instance is an instantiation of a process template of the business processes. For example, business processes defined in Web Services Business Process Execution Language (WS-BPEL) represent stateful Web services, and as such, they can have long running interactions with other Web services.

Further, an instance completes when its last activity completes, a terminate activity runs, or a fault occurs that is not handled by the process. Moreover, business process execution, represents a period or phase during which the business process is operational or being executed, with process instances being created and managed within cloud management environment 100, in accordance with embodiments of the present invention.

For example, telecommunications or credit card companies are required to perform dispute management of wrongful billing services or statements of customers, and in certain instances, they are also required to provide of discrepancies of the wrongful billing service to the customers during the dispute. Consider, for instance, a scenario in which the telecommunications company generates a monthly bill or invoice for the customer based on the customer's selected plan and call data records of telecommunication services. Suppose, for instance, monthly billing or invoicing is processed through the business process instance or process execution of BPM of cloud management environment 100, in which the BPM through its various automated process steps or tasks, and through appropriate business process orchestration or business process choreography, generates the monthly invoice based on the customer's selected plans, including, for example, voice plans, data plans, 3G plans, SMS plans, etc.

Also, consider another scenario in which the customer disputes a transaction, such as a wrong plan or incorrect listing of calls in the invoice, and files a complaint with the telecommunications company regarding the dispute of the monthly service. Further, consider, for instance that due to insatisfactory resolution, the customer approaches a tribunal or other regulatory authority for filing a complaint of the dispute. The tribunal may take long to process the dispute, for example, processing the dispute may take up to 2-3 years from the date the complaint was filed, and moreover, during this time, the telecommunications provider will need to provide evidence or proof of the monthly billing details of the customer to defend against the complaint filed to the tribunal. In the meantime, from a BPM software perspective, the business process instance which was used to calculate and generate the monthly invoice, has ended its execution and would have been removed from the application or system of cloud management environment 100. It is also possible that the input data, such as, user plan details, call data records, master data referred by system, etc. which were used by the business process instance would have been archived to offline storage or deleted based on data archival policies followed by the telecommunications company.

Further, the business process itself may have undergone changes, including, for example, installation of a new version of BPM software, or a new version of the business process definition of BPM, such that it is not possible to recreate and run the original version of the business process instance including input and output data. In addition, in a cloud computing environment, the virtual instance on which the BPM software was installed and operational, as well as the virtual instances which contained the input and output data sources or master data sources, may have been deprovisioned or decommissioned, such that it is no longer possible to trace these virtual instances after a gap of 2-3 years of the complaint to the tribunal.

According to embodiments of the present invention, by recreating or restoring a previous version of an entire business process instance or process execution of the BPM of the telecommunications company or service provider, the BPM of cloud management environment 100 is configured to reconstruct, recreate, or restore the business process execution of the monthly billing statements of the customer by using the original input data and business process instance or business process execution of BPM through a virtual process archival manager of cloud management environment 100.

Cloud management environment 100 includes provisioning manager 120 and virtual process archival manager (VPAM) 124. As depicted in FIG. 1, cloud management environment 100 is connected to locations L1, L2, L3, and L4 and networks N1, N2, N3, and N4 which each include managed pools of virtual instances, C1, C2, C3, and C4, respectively.

According to aspects of the present invention, locations L1, L2, L3, and L4 are geographical locations, including, for example, country, city, area, specific building, specific floor within a specific building, specific room or cubicle within a specific building or a specific physical server computing system, a physical computing blade, or physical computing rack within a specific building or any random combination of such locations, or any other physical or virtual computing locations. Two or more locations, including, for instance, locations L1 and L2, or L3 and L4 are the same locations, but may include different networks N1 and N2. Cloud management environment 100 may also contain same data centers, including, physical or virtual servers, configured on two or more physical or logical networks or subnets of networks N1, N2, N3, and N4 and locations L1, L2, L3, and L4.

Networks N1, N2, N3, and N4 include one or more networks of any kind that provides communication links between various devices and computers connected together within cloud management environment 100. Networks N1, N2, N3, and N4 also include connections, such as wired communication links, wireless communication links, or fiber optic cables. Networks N1, N2, N3, and N4 can further be implemented as a number of different types of networks, including, for example, a local area network (LAN), wide area network (WAN) or a public switched telephone network (PSTN), or some other networked system. Networks N1, N2, N3, and N4 can also include the Internet representing a world-wide collection of networks.

In the illustrated embodiment, managed pools of virtual instances, C1, of L1 and N1, includes BPM environment of cloud management environment 100, for example, (VI_BPM1) and (VI_BPM2) and output data (VI_OD). Managed pools of virtual instances, C2, of L2 and N2, includes input data sources of cloud management environment 100, for example, input data sources (VI_ID1) and (VI_ID2) and master data environment (VI_MD). Managed pools of virtual instances, C3, of L3 and N3, includes virtual instances with data archives of cloud management environment 100, for example, input data archives (VI_IDA), output data archive (VI_ODA), master data archive (VI_MDA). Managed pools of virtual instances, C4, of L4 and N4, includes virtual instances with business process archive manager (BPAM) of cloud management environment 100, for example, business process archive manager (VI_BPAM) and log archives (VI_LA).

Provisioning manager 120 deploys, monitors, and manages managed pools of virtual instances, C1, C2, C3, and C4 in cloud management environment 100. Provisioning manager 120 can be, for example, IBM® Tivoli® Service Automation Manager (IBM and Tivoli are trademarks of International Business Machines Corporation in the United States, other countries, or both). For example, provisioning manager 120 maintains a record of managed pools of virtual instances, C1, C2, C3, and C4 in cloud management environment. VPAM 124 monitors archived versions of business process instances or business process executions of BPM, including, for example, recreating or restoring process versions, input data or files, referenced master data or master files, output data, and all associated metadata for designated BPM environments managed in cloud management environment 100. VPAM 124 also monitors and maintains relationships between the BPM environments and data repositories, archives of the data repositories, and virtual instances on which the BPM environments are installed in cloud management environment 100. VPAM 124 includes VPAM data storage 130, process archival recorder 126, restore manager 134, and archival monitor 132.

VPAM data storage 130 can be any type of storage device, storage server, storage area network, redundant array of independent discs (RAID), cloud storage device, or any type of data storage for maintaining a record of business process instance or business process execution of BPM environments in cloud management environment. Process archival recorder 126 maintains a record of business process instance or business process execution, including all related archival environment associated with the business process instance or business process execution that is archived in VPAM data storage 130.

In particular, process archival recorder 126 creates archival reference unique ID 128 for assigning identifiers to each business process instance or business process execution, including one or more input data or metadata of BPM to be archived in cloud management environment 100. The assigned identifiers are assigned to the business process instance or business process execution for recording or tagging of each of the business process instance or business process execution with managed pools of virtual instances, C1, C2, C3, and C4, as well as the data or metadata that is referenced by BPM in cloud management environment 100.

Process archival recorder 126 stores and maintains the recorded business process instance or business process execution with managed pools of virtual instances, C1, C2, C3, and C4, as well as input data entity, output data entity, master data entity, BPM environments, BPAM environments, input and output data sources, or files, master data sources or reference files, log files, and all related archival environments associated with BPM processed to be archived in VPAM data storage 130. For instance, process archival recorder 126 can also create assigned identifiers for archival reference unique ID 128, and associate the assigned identifiers with each business process instance or business process execution, as well data or metadata referenced by BPM in cloud management environment 100. Archival monitor 132 monitors managed pools of virtual instances, C1, C2, C3, and C4, BPM environments, input and output data sources or files, data sources or reference files, log files, and all related archival environments associated with BPM to be processed, archived and stored in VPAM data storage 130. For example, archival monitor 132 monitors BPM requests of provisioning manager 120 for provisioning, deprovisioning, decommissioning and deletion of virtual instances in managed pools of virtual instances, C1, C2, C3, and C4.

According to at least one embodiment, if archival monitor 132 detects that the BPM requests to a virtual instance contains a BPM or BPAM archival monitor 132 raises an alert for triggering restore manager 134 to enable restoration of specific processes or process execution instances of BPM. In addition, archival monitor 132 can also generate logs for all relevant events, actions, and alerts monitored or generated by VPAM 124. For example, restore manager 134 is triggered by archive monitor 132 component of VPAM 124 for a request or scheduled task for restoring an archived process and associated data and metadata of BPM. Further, restore manager 134 also retrieves details of the archived process and associated data and metadata of the archived process. For example, restore manager 134 is triggered by archival monitor 132 for a request or scheduled task for restoring an archived business process instance or business process execution, including, data and metadata of BPM. Restore manager 134 retrieves details of the archived business process instance or business process execution from process archive recorder 126 and VPAM data storage 130, and restores the retrieved details of the archived business process instance or business process execution, including, associated data, metadata of any managed pools of virtual instances, C1, C2, C3, and C4 in cloud management environment 100.

Figure 2:
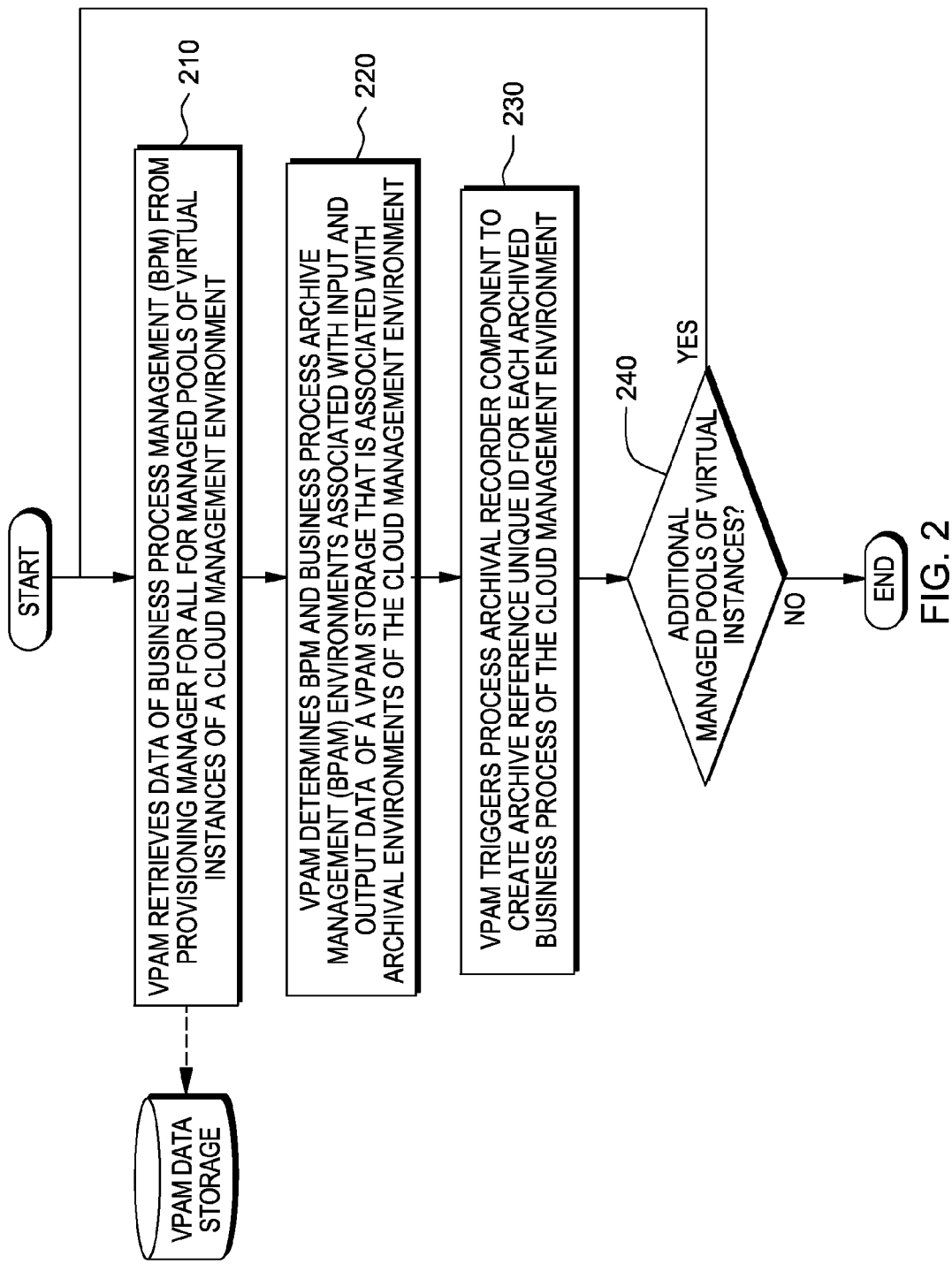
FIG. 2 is a flowchart depicting steps performed by a virtual process archival manager (VPAM) to archive management of business processes in a cloud management environment, in accordance with embodiments of the present invention.

FIG. 2 is a flow chart depicting steps performed by VPAM 124 for transmitting information from provisioning manager 120 in cloud management environment 100, in accordance with embodiments of the present invention. According to embodiments of the present invention, VPAM 124 is integrated to communicate with provisioning manager 120 and other components of cloud management environment 100, such that, VPAM 124 is an integral component of cloud management environment 100.

Further, VPAM 124 retrieves data from provisioning manager 120. The data includes a list for all managed pools of virtual instances, C1, C2, C3, and C4 in cloud management environment 100. (Step 210). For example, as described, provisioning manager 120 includes the list of all managed pools of virtual instances, C1, C2, C3, and C4, stored in VPAM data storage 130, and configured and managed on cloud management environment 100, including, for instance, a list and configuration details of all managed pools of virtual instances, C1, C2, C3, and C4 that are provisioned within cloud management environment 100, for recreating or restoring of a previous version of an entire business process, within locations and networks. VPAM can also retrieve data from other components of cloud management environment 100 for configured managed pools of virtual instances, C1, C2, C3, and C4 of cloud management environment 100.

VPAM 124 further determines all BPM environments and BPAM environments, associated with input and output data information of VPAM data storage 130 associated with archival environments of cloud management environment 100. (Step 220). For example, based on the data retrieved from provisioning manager 120 for all managed pools of virtual instances C1, C2, C3, and C4 in Step 210, VPAM 124 determines which managed pools of virtual instances C1, C2, C3, and C4, containing BPM and BPAM environments in cloud environment 100. For each BPM and BPAM environments, VPAM 124 also determines all input and output data sources or files, associated master data sources or reference files, associated log files, and all associated archival environments of cloud management environment 100.

VPAM 124 further triggers process archival recorder 126 to create archive reference unique ID 128 for each archive business process instance or business process execution, including, associated input and output data for BPAM environments or associated data archival environments of cloud management environment 100. (Step 230). In addition, VPAM 124 stores the created reference identifiers for BPM or BPAM environments or associated data archival environments in VPAM data storage 130. If there are additional managed pools of virtual instances, C1, C2, C3, and C4 within cloud management environment for reading, and retrieving data from provisioning manager 120 (Decision 240), then at step 210, VPAM 124 continues to read or retrieve data from provisioning manager 120 (Step 210), including a list for all additional managed pools of virtual instances, C1, C2, C3, and C4 available on cloud management environment 100, if not, the process for transmitting information from provisioning manager 120 by VPAM 124 in cloud management environment 100 ends.

FIG. 3A is a functional block diagram depicting steps performed by archival monitor 132 to archive BPM in cloud management environment 100, in accordance with embodiments of the present invention. VPAM 124 invokes archival monitor 132 to perform real time monitoring across managed pools of virtual instances, C1, C2, C3, and C4 of cloud management environment 100 including data stored in VPAM data store 130. The data includes information retrieved from provisioning manager 120 by VPAM 124, including, for example, a list for all managed pools of virtual instances, C1, C2, C3, and C4 of cloud management environment 100, as well as details of all business process instance and business process execution of BPM and BPAM environments, associated input and output data sources or files, associated master data sources or reference files, associated log files, and all associated archival environments available on the managed pools of virtual instances, C1, C2, C3, and C4 of cloud management environment 100. (Step 320).

Archival monitor 132 performs real time monitoring of requests or scheduled tasks for business process instance or business process execution of BPM, and data archival and restoration across all configured and available managed pools of virtual instances, C1, C2, C3, and C4 of cloud management environment 100. (Step 340). Further, archival monitor 132 continues monitoring of the requests and scheduled task until monitoring process by archival monitor 132 is terminated by VPAM 124. Each request or scheduled task for process archival, data archival or restoration raised within cloud management environment 100 is detected by archival monitor 132, and for each such archival request or scheduled tasks, archival monitor 132 determines impacted business process instance or business process execution and associated input and output data, referenced data and metadata. (Step 360). For example, VPAM 124 archives managed pools of virtual instances, C1, C2, C3, and C4 including one or more versions of a business process instance or business process execution of BPM of cloud management environment 100. The one or more versions of a business process instance or business process execution includes process version, input data or files, referenced data or files, output data, and all associated metadata of a business process management environment or a BPAM environment of cloud management environment 100. Archival monitor 132 further triggers the creation or update of detailed records including, for example, creation of archive reference unique ID 128 or assigned identifiers. For example, VPAM 124 triggers an update or creation of assigned identifiers of archive reference unique ID 128 to at least one of the one or more versions of the business process instance or business process execution, and stores assigned identifiers of the one or more versions of the business process instance or business execution that is archived in storage. In another example, the assigned identifier is tagged to the one or more versions of the business process instance or business process execution that is archived in VPAM data storage 130, in accordance with the present invention.

FIG. 3B is a functional block diagram depicting steps performed by archival monitor 132 to monitor provisioning manager 120, including, monitoring of managed pools of virtual instances, C1, C2, C3, and C4 for task or requests of BPM or BPAM in cloud management environment 100, in accordance the present invention.

Archival monitor 132 monitors provisioning manager 120 and detects requests or tasks for provisioning, deprovisioning, decommissioning or deleting the one or more versions of a business process instance or business process execution of managed pools of virtual instances, C1, C2, C3, and C4 (Step 370). For example, requests for provisioning, deprovisioning, decommissioning or deleting the one or more versions of a business process instance or business process execution by archival monitor 132 are raised and routed to provisioning manager 120 to detect and intercept such requests in cloud management environment 100. For each of the requests or tasks, archival monitor 132 determines if impacted managed pools of virtual instances, C1, C2, C3, and C4 contains one of BPM or BPAM environments, including, associated input and output data, referenced data and metadata, or associated archival business process management environment or a BPAM environment of cloud management environment 100. (Decision 375). If archival monitor 132 determines that managed pools of virtual instances, C1, C2, C3, and C4 does contain BPM or BPAM environments, archival monitor 132 issues an alert or takes appropriate action to restore the archived process and associated data and metadata of the BPM or BPAM environments in cloud management environment 100. (Step 380). However, if it is determined that managed pools of virtual instances, C1, C2, C3, and C4 does not contain BPM or BPAM environments, archival monitor 132 continues to monitor provisioning manager 120 to detect requests or tasks for provisioning, deprovisioning, decommissioning or deleting the one or more versions of a business process instance or business process execution of managed pools of virtual instances, C1, C2, C3, and C4 (Step 370).

Figure 3C:
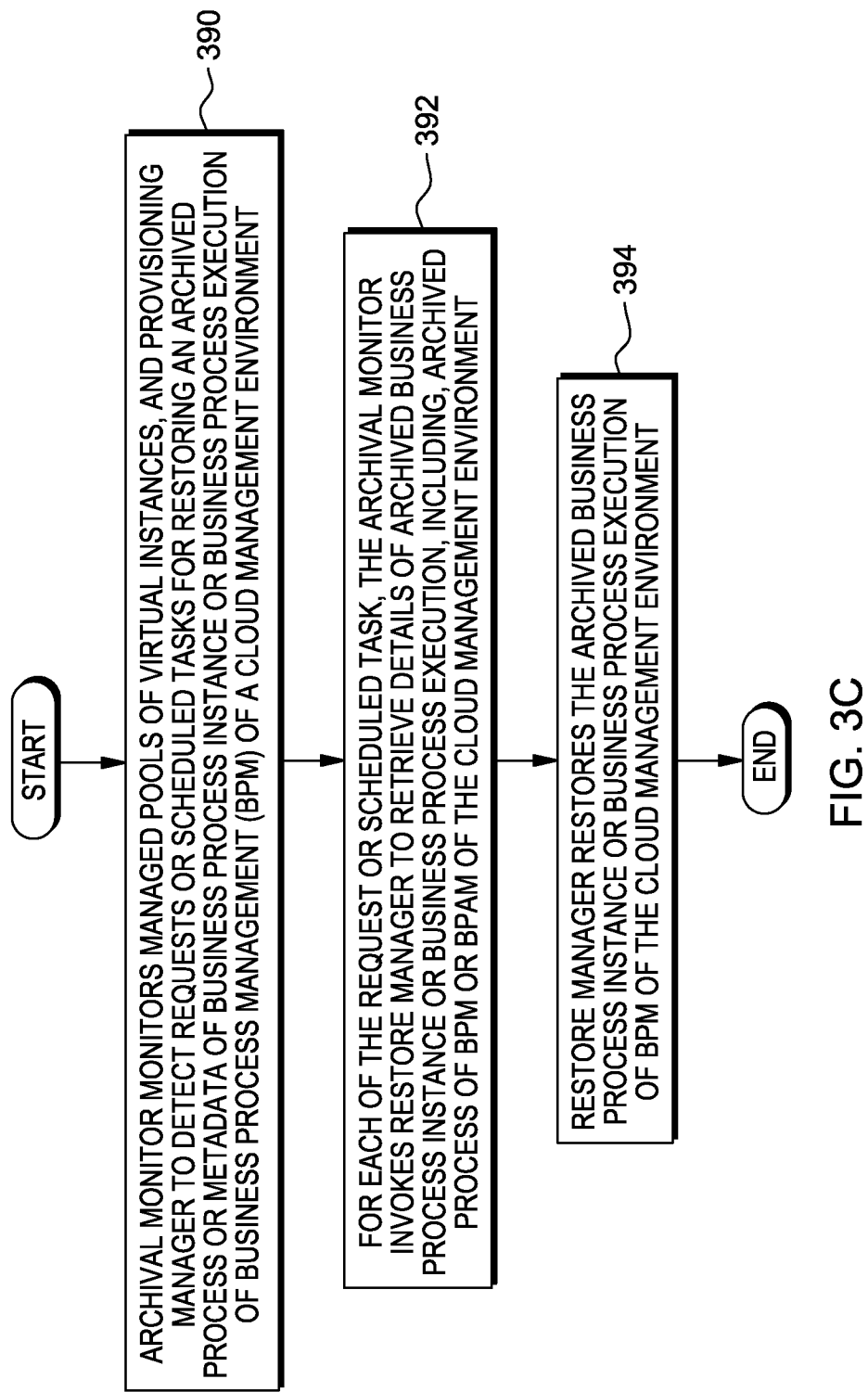

FIG. 3C is a functional block diagram depicting steps performed by archival monitor 132 to restore business process instance or business process execution, including, restoration of managed pools of virtual instances, C1, C2, C3, and C4 of BPM in cloud management environment 100, in accordance with embodiments of the present invention.

Archival monitor 132 monitors managed pools of virtual instances, C1, C2, C3, and C4 and provisioning manager 120 to detect requests or scheduled tasks for restoring an archived process of business process instance or business process execution of BPM, including, associated data and metadata of BPM and BPAM in cloud management environment. (Step 390). For each request or scheduled task, archival monitor 132 invokes restore manager 134 to retrieve details of archived business process instance or business process execution, including, archived process of BPM or BPAM, including, associated data, and metadata of assigned identifiers of archive reference unique ID 128. (Step 392).

Restore manager 134 restores the archived business process instance or business process execution, including restoration or reprovisioning of managed pools of virtual instances, C1, C2, C3, and C4 in cloud management environment 100. (Step 394). For example, restore manager 134 restores associated data and metadata of business process management environment or the BPAM in cloud management environment 100, including, recreation, restore or reprovisioning virtual instances of managed pools of virtual instances, C1, C2, C3, and C4 which may have been decommissioned during archival of business process instance or business process execution.

Figure 4:
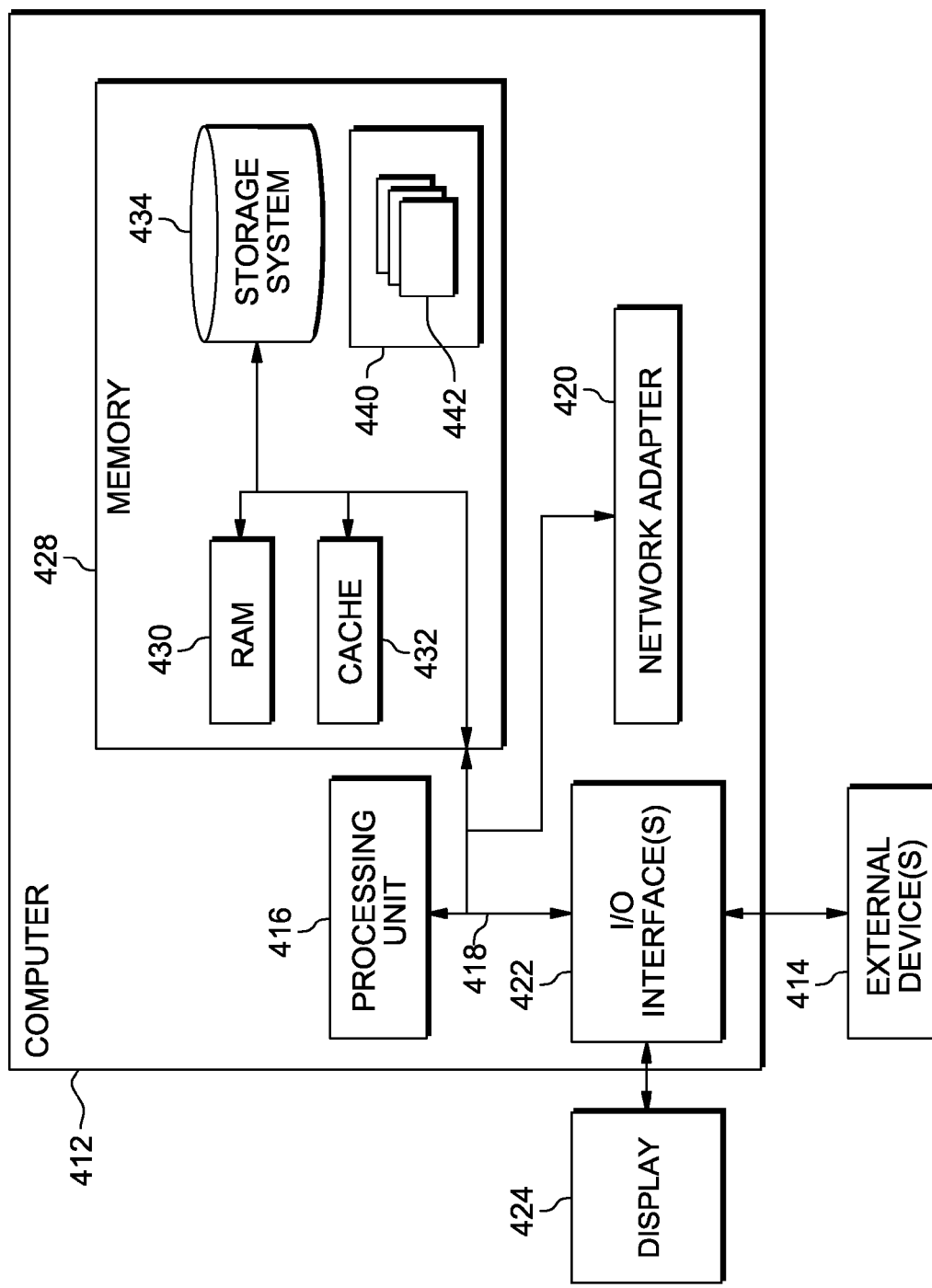
FIG. 4 illustrates a block diagram of components of a computer system in accordance with embodiments of the present invention.

FIG. 4 is a block diagram of a computer system, in accordance with an embodiment of the present invention.

Computer system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove. In computer system 400 there is computer 412, which is operational with numerous other general purpose or special purpose computing system environments or configurations. Examples of well-known computing systems, environments, and/or configurations that may be suitable for use with computer 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Cloud management environment 100 can be implemented as an instance of computer 412.

Computer 412 may be described in the general context of computer system executable instructions, such as program modules, being executed by a computer system. Generally, program modules may include routines, programs, objects, components, logic, data structures, and so on that perform particular tasks or implement particular abstract data types. Computer 412 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 4, computer 412 is shown in the form of a general-purpose computing device. The components of computer 412 may include, but are not limited to, one or more processors or processing units 416, memory 428, and bus 418 that couples various system components including memory 428 to processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 412 typically includes a variety of computer system readable media. Such media may be any available media that is accessible by computer 412, and includes both volatile and non-volatile media, and removable and non-removable media.

Memory 428 includes computer system readable media in the form of volatile memory, such as random access memory (RAM) 430 and/or cache 432. Computer 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

VPAM 124 can be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. VPAM 124 can be implemented as an instance of program 440.

Computer 412 may also communicate with one or more external devices 414 such as a keyboard, a pointing device, etc., as well as display 424; one or more devices that enable a user to interact with computer 412; and/or any devices (e.g., network card, modem, etc.) that enable computer 412 to communicate with one or more other computing devices. Such communication occurs via Input/Output (I/O) interfaces 422. Still yet, computer 412 communicates with one or more networks such as a local area network (LAN), a general wide area network (WAN), and/or a public network (e.g., the Internet) via network adapter 420. As depicted, network adapter 420 communicates with the other components of computer 412 via bus 418. It should be understood that although not shown, other hardware and/or software components could be used in conjunction with computer 412. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method for archiving business processes in a virtualized cloud computing environment have been disclosed. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A method for archival management of business processes in a cloud environment, the method comprising the steps of:

archiving, by one or more computer processors, managed pools of virtual instances of a business process management program, wherein each managed pool includes one or more versions of an entire business process instance or an entire business process execution of the business process management program in the managed pools of virtual instances via a virtual process archival system of the cloud environment;

monitoring, by the one or more computer processors, an automation manager to detect requests or tasks for provisioning, deprovisioning, decommissioning or deleting the one or more versions of the entire business process instance or the entire business process execution, wherein the managed virtual pools of the business process management program recreate or restores input data or files, referenced master data or master files, output data, and metadata for designated for the entire business process instance or the entire business process execution;

for each of the requests or tasks, determining, by the one or more computer processors, when the managed pools of virtual instances contain a business process management environment or a business process archive manager environment, of the business process management program, and wherein, altering actions to restore previous managed pools of virtual instances is based on the one or more versions of the entire business process instance or the entire business process execution if the managed pools of virtual instances contains a business process management environment or a business process archive manager environment; and archiving and recreating, or restoring by the one or more computer processors, a previous version of the one or more versions of the entire business process instance or the entire business process execution based on the determination, wherein a connection between business process management environments of the business process instance and business process execution, archives of data repositories of the entire business process instance and the entire business process execution, and managed pools of virtual instances of the cloud environment is maintained by the virtual process archival system of the cloud environment and, wherein, the one or more versions of the entire business process instance or the entire business process execution includes at least one of a process version, input data or files, referenced data or files, output data, and all associated metadata of the business process management environment or business process archive manager environment, of the business process management program.

2. The method according to claim 1, further including the steps of:

triggering, by the one or more computer processors, assignment of identifiers to at least one of the one or more versions of the entire business process instance or entire business process execution;

tagging, by the one or more computer processors, the assignment of identifiers to the at least one of the one or more versions of the entire business process instance or the entire business process execution; and storing, by the one or more computer processors, the assignment of identifiers of the at least one of the one or more versions of the entire business process instance or the entire business execution archived in a repository.

3. The method according to claim 1, wherein the step of one or more computers determining if the managed pools of virtual instances contains a business process management environment or a business process archive manager environment further includes the step of:

altering, by the one or more computer processors, actions to restore previous managed pools of virtual instances based on the one or more versions of the entire business process instance or the entire business process execution if the managed pools of virtual instances contains a business process management environment or a business process archive manager environment.

4. The method according to claim 1, wherein the cloud environment is connected to network locations which includes the managed pools of virtual instances.

5. The method according to claim 1, wherein a record of a business process management containing the entire business process instance or the entire business process is maintained in a repository of the cloud environment.

6. A computer system for archival management of business processes in a cloud environment, the computer system comprising:

one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions to archive managed pools of virtual instances of a business process management program, wherein each managed pool includes one or more versions of an entire business process instance or an entire business process execution of the business process management program in the managed pools of virtual instances via a virtual process archival system of the cloud environment;

program instructions to monitor an automation manager to detect requests or tasks for provisioning, deprovisioning, decommissioning or deleting the one or more versions of the entire business process instance or the entire business process execution, wherein the managed virtual pools of the business process management program recreate or restores input data or files, referenced master data or master files, output data, and metadata for designated for the entire business process instance or the entire business process execution;

for each of the requests or tasks, program instructions to determine when the managed pools of virtual instances contain a business process management environment or a business process archive manager environment, of the business process management program, and wherein, altering actions to restore previous managed pools of virtual instances is based on the one or more versions of the entire business process instance or the entire business process execution if the managed pools of virtual instances contains a business process management environment or a business process archive manager environment; and program instructions to archive and recreate, or restore a previous version of the one or more versions of the entire business process instance or the entire business process execution based on the determination, wherein a connection between business process management environments of the business process instance and business process execution, archives of data repositories of the entire business process instance and the entire business process execution, and managed pools of virtual instances of the cloud environment is maintained by the virtual process archival system of the cloud environment and, wherein, the one or more versions of the entire business process instance or the entire business process execution includes at least one of a process version, input data or files, referenced data or files, output data, and all associated metadata of the business process management environment or business process archive manager environment, of the business process management program.

7. The computer system according to claim 6, further includes:

program instructions to trigger assignment of identifiers to at least one of the one or more versions of the entire business process instance or entire business process execution;

program instructions to tag the assignment of identifiers to the at least one of the one or more versions of the entire business process instance or the entire business process execution; and program instructions to store the assignment of identifiers of the at least one of the one or more versions of the entire business process instance or the entire business execution archived in a repository.

8. The computer system according to claim 6, wherein program instructions to determine if the managed pools of virtual instances contain a business process management environment or a business process archive manager environment, further includes:

program instructions to alter actions to restore previous managed pools of virtual instances based on the entire business process instance or the entire business process execution if the managed pools of virtual instances contains a business process management environment or a business process archive manager environment.

9. The computer system according to claim 6, wherein the cloud environment is connected to network locations which includes the managed pools of virtual instances.

10. A computer program product for archival management of business processes in a cloud environment, the computer program product comprising:

one or more computer-readable tangible storage devices and program instructions stored on at least one of the one or more storage devices, the program instructions comprising:

program instructions to archive managed pools of virtual instances of a business process management program, wherein each managed pool includes one or more versions of an entire business process instance or an entire business process execution of the business process management program in the managed pools of virtual instances via a virtual process archival system of the cloud environment;

program instructions to monitor an automation manager to detect requests or tasks for provisioning, deprovisioning, decommissioning or deleting the one or more versions of the entire business process instance or the entire business process execution, wherein the managed virtual pools of the business process management program recreate or restores input data or files, referenced master data or master files, output data, and metadata for designated for the entire business process instance or the entire business process execution;

for each of the requests or tasks, program instructions to determine when the managed pools of virtual instances contain a business process management environment or a business process archive manager environment, of the business process management program, and wherein, altering actions to restore previous managed pools of virtual instances is based on the one or more versions of the entire business process instance or the entire business process execution if the managed pools of virtual instances contains a business process management environment or a business process archive manager environment; and program instructions to archive and recreate, or restore a previous version of the one or more versions of the entire business process instance or the entire business process execution based on the determination, wherein a connection between business process management environments of the business process instance and business process execution, archives of data repositories of the entire business process instance and the entire business process execution, and managed pools of virtual instances of the cloud environment is maintained by the virtual process archival system of the cloud environment and, wherein, the one or more versions of the entire business process instance or the entire business process execution includes at least one of a process version, input data or files, referenced data or files, output data, and all associated metadata of the business process management environment or business process archive manager environment, of the business process management program.

11. The computer program product according to 10 further includes:

program instructions to trigger assignment of identifiers to at least one of the one or more versions of the entire business process instance or entire business process execution;

program instructions to tag the assignment of identifiers to the at least one of the one or more versions of the entire business process instance or the entire business process execution; and program instructions to store the assignment of identifiers of the at least one of the one or more versions of the entire business process instance or the entire business execution archived in a repository.

12. The program instructions according to claim 10, wherein program instructions to determine if the managed pools of virtual instances contains a business process management environment or a business process archive manager environment further includes:

program instructions to alter actions to restore previous managed pools of virtual instances based on the one or more versions of the business process instance or business process execution if the managed pools of virtual instances contains a business process management environment or a business process archive manager environment.

13. The program instructions according to claim 10, wherein the cloud environment is connected to network locations which includes the managed pools of virtual instances.

14. The program instructions according to claim 10, wherein a record of a business process management containing the entire business process instance or the entire business process is maintained in a repository of the cloud environment.

* * * * *